United States Patent [19]
Hansen et al.

[11] Patent Number: 5,587,896
[45] Date of Patent: Dec. 24, 1996

[54] SELF-TUNING CONTROLLER

[75] Inventors: Peter D. Hansen, Wellesley Hills; Edgar H. Bristol, Foxboro, both of Mass.

[73] Assignee: The Foxboro Company, Foxboro, Mass.

[21] Appl. No.: 553,915

[22] Filed: Jul. 16, 1990

[51] Int. Cl.⁶ .................................................. G05B 13/02
[52] U.S. Cl. ........................ 364/148; 364/158; 364/159; 364/162
[58] Field of Search ..................... 364/148, 149, 364/150, 151, 152, 160–163, 158, 159

[56] References Cited

U.S. PATENT DOCUMENTS

| | | | |
|---|---|---|---|
| 3,798,426 | 3/1974 | Bristol, II | 364/148 |
| 4,602,236 | 7/1986 | Kraus | 364/158 |
| 4,855,897 | 8/1989 | Shinskey | 364/148 |
| 4,864,490 | 9/1989 | Nomoto et al. | 364/162 |
| 4,903,192 | 2/1990 | Saito et al. | 364/162 |
| 5,043,862 | 8/1991 | Takahashi et al. | 364/162 |
| 5,153,807 | 10/1992 | Saito | 364/162 |

FOREIGN PATENT DOCUMENTS

| | | |
|---|---|---|
| 89191141 | 7/1988 | Japan . |
| 8866523 | 12/1989 | Japan . |

OTHER PUBLICATIONS

F. Radke: Microprocessor–Based Adaptive PID–Controllers, ISA Transactions vol. 27, No. 2 (1988) pp. 43–50.
Mauricio Alves da Silva, et al., A Rule Based Procedure for Selftuning PID Controllers, Proc. 27th IEEE Conf. on Decision and Control vol. 313 Dec. 1988, pp. 1947–1951.

*Primary Examiner*—Roy N. Envall, Jr.
*Assistant Examiner*—Thomas E. Brown
*Attorney, Agent, or Firm*—Jules Jay Morris; Terrence Martin; David Barron

[57] ABSTRACT

An apparatus and method for automatically adjusting the control parameters of a self-tuning controller used to regulate a process having a measured process variable signal. Using the measured process variable signal, an error signal representing a closed-loop response of the process to an upset condition is generated. Local extrema of the error signal is measured and three successive amplitude values are selected to produce measured decay and overshoot characteristics of the error signal. The three successive amplitude values are selected such that the measured decay characteristic is greater than the overshoot characteristic. Based on the measured decay and overshoot characteristics at least one of the control parameters of the controller is automatically adjusted to improve the difference between one of the measured characteristics and a target characteristic.

55 Claims, 10 Drawing Sheets

SELF-TUNING CONTROLLER

FIELD OF THE INVENTION

This invention relates to self-tuning adaptive controllers for controlling a process and more particularly to pattern-recognition, self-tuning controllers.

BACKGROUND OF THE INVENTION

The pattern recognition approach to self-tuning is unique. It uses direct-performance feedback of a monitored process variable to determine the required action for optimizing the process. More specifically, a pattern-recognition, self-tuning controller continuously monitors and automatically evaluates a closed-loop response pattern of a measured process variable to naturally occurring, unmeasured upsets caused by a change in set point or load. After each upset, closed-loop error response characteristics such as overshoot and decay are identified and compared, with desired characteristics. Differences between the desired characteristics and the measured characteristics are then used to automatically generate new tuning values for adjusting the controller according to the requirements of the process in order to achieve an error response target shape. The target shape is chosen to approximately minimize integrated absolute error.

The first successful adaptive process control system to automatically identify and evaluate process response characteristics of the closed-loop response pattern was invented by Edgar H. Bristol, II and is disclosed in U.S. Pat. No. 3,798,426. According to Bristol's method, the adaptation system is triggered by detecting the closed-loop response pattern resulting from an upset having a magnitude which exceeds a preselected noise band. Once triggered, dead and rise times are identified by measuring the time required for the response pattern to reach predetermined percentages of the extremum value of the upset during its first half cycle. The dead time is assumed to bear a significant relationship to any process dead time which is most apparent early in the measured variable response, and rise time is assumed to bear a significant relationship to process closed-loop natural period.

The measured rise time is scaled to establish evaluation intervals for the adaptation process. Scaling constants, used to determine these intervals, are selected so that the first half cycle in a resonant response is developed during one evaluation interval and the first full cycle is fully developed during another. The response pattern is evaluated by calculating the integrated difference between the measured process control error, normalized by the magnitude of the first error response peak, and a target value for each of the evaluation intervals. The integrated differences are used to adapt the operating parameters of the controller to improve control action during the next process upset.

For an effective adaptive process control system, several critical parameters must be specified by an operator. For example, the proper selection of scaling constants is critical for defining the appropriate evaluation intervals. Universal scaling constants cannot be used for different types of processes. This control system also requires the operator to select an appropriate target value for each evaluation interval. These target values are typically derived from the operator's experience with a given process.

An improved pattern-recognition, self-tuning controller was developed by Thomas W. Kraus. According to Kraus' method, the adaptive process is initiated when the error exceeds a nominal noise threshold. Once initiated, the closed-loop response pattern is monitored to detect the first three successive extremum values or "peaks" and their times of occurrence relative to the first peak.

Since it is common to find an overdamped control loop response without three peaks, Kraus' adaptive process automatically recognizes the response as overdamped if, after a pre-specified wait period after verifying the first peak, the second peak is not found. If a second peak is found, the third peak is sought for a time period proportional to the time between the first and second peaks. If the second or third peak is not detected, the search for peaks is terminated and "pseudo" peak values are assigned.

Characteristics of the closed-loop response pattern, such as overshoot, damping, and period, are then calculated using the measured extremum values of the response pattern. Differences between these measured characteristics and desired characteristics are then used to calculate new control operating parameters to optimize the control action. This method is described in greater detail in U.S. Pat. No. 4,602,326, issued to Thomas Kraus, and entitled, "Pattern-recognition, Self-tuning Controller." As described in both patents to Bristol and Kraus, which are incorporated by reference, the system tunes the controller for the last disturbance. This can result in non-optimum tuning of the controller for the next disturbance, if the process is nonlinear.

Kraus' system also has critical parameters which must be specified by an operator. For example, choosing the pre-specified wait period in Kraus' system is critical, particularly when the process operates over a wide range of conditions. This wait period is critical because it also establishes a wait time before the peak search is activated. If it is set improperly, the system may not operate efficiently. The system also has a tendency to tighten the tuning of the process when the second and third peaks are lost in the noise band. After several disturbances, the response can become excessively oscillatory, causing the system to overcorrect the process which results in overdamping the response. Further, thresholds for the noise band are either user-selected or determined during a pretuning operation for an open loop condition. It does not adaptively respond to condition changes in a closed-loop process.

SUMMARY OF THE INVENTION

It is an object of the present invention to provide an adaptive controller having a tuning algorithm that is sensitive to the pattern features of the error response to a disturbance but less sensitive to the disturbance's type or shape and its location relative to a dominant process lag.

It is a further object of the present invention to provide a faster recovery from overdamped tuning by locating a quasi second or third peak using a knee detection scheme.

It is a further object of the present invention to reduce the number of critical parameters the operator must specify to achieve the desired optimized control action.

It is a further object of the present invention to prevent detuning with respect to one type of disturbance when a second type of disturbance or a set-point change occurs.

It is a further object of the present invention to prevent adaptive tuning when both the target and measured control error pattern features cannot be distinguished from noise.

It is a further object of the present invention to adaptively determine a wait time after detecting a peak to insure that additional peaks cannot be found before terminating the search for those peaks.

It is a further objective of the present invention to tune a nonlinear process at the beginning of a response transient using successful past tunings.

It is a further object of the present invention to provide a method for updating the noise band during quiet periods between isolated error responses.

It is a further object of the present invention to provide a self-tuning controller which determines a process type parameter, which classifies the process between dominant lag and dominant delay, to aid in the selection of tuning parameters that are appropriate for the particular type of process.

In general, the invention features a self-tuning controller that characterizes a closed-loop error response for determining appropriate control parameter changes to improve the performance of the process in response to a disturbance. This error response or error signal can be calculated directly from a process controlled variable if the user is only interested in adapting only one parameter such as the proportional band of the controller. However, in the preferred embodiment, the error signal is calculated as the difference between a set point and the measured process variable signal in order to automatically adjust more than one parameter of the controller. A realization of the present invention is that, by a judicious selection of pattern features available from the error signal, the adaptation of control parameters can be made less sensitive to the disturbance shape and location.

To that end, the present invention provides a method for automatically adjusting the control parameters of the self-tuning controller used to regulate a process having a measured process variable signal. The method includes generating an error signal representing a closed-loop response of the process to an upset condition. Three successive amplitude values of the error signal are selected and measured to produce measured decay and overshoot characteristics. The three successive amplitudes are selected such that the measured decay characteristic is greater than the overshoot characteristic. At least one of the control parameters of the controller is then automatically adjusted to reduce the difference between one or both of the measured characteristics and target characteristics.

In accordance with one aspect of the invention, the type of process to be regulated is determined and the determined process type is used to calculate changes in the control parameters for achieving rapid convergence to the target characteristic. Note, that the type of process may be declared by the user or determined automatically from information provided by the error response and the current controller parameters. More specifically, the process type parameter is used as an interpolating or extrapolating factor relating controller parameters to response characteristics based on predetermined data from at least two different processes.

The step of measuring amplitude values can include measuring four or more successive amplitude values of local extrema of the error signal. If the fourth amplitude value is needed but cannot be detected, it can be estimated using the previously measured amplitudes. Three of the four successive amplitude values are then combined to determine the decay and overshoot characteristic values to adjust at least one of the control parameters. The step of locating and measuring the amplitudes may further include locating a knee of the error signal later in time to a first local extremum. The time interval between a first local extremum and the knee determines a time scale of the error signal response. This time interval can then be used to determine a time interval for searching for a second local extremum. If this interval expires before locating a local extremum, then the knee is used as the amplitude value and the search for peaks terminates.

According to another aspect of the invention, the method for automatically adjusting the control parameters of the self-tuning controller may further include the step of sampling a user-selected process variable when a new disturbance response is detected. The user-selected process variable can be subdivided into subranges in which each subrange corresponds to a set of previously adapted control parameters. The subrange of the user-selected variable determines which set of stored controller parameters is most appropriate for the just detected disturbance. The sign of the initial error response can also be used to catalog and select among previous stored sets of controller parameters.

A lead-lag filter can also be provided to filter the set-point signal to prevent an excessive error overshoot in response to a set-point change when the controller is well tuned for a load upset. The lag is set equal to the controller integral time. The ratio of lead to lag can be adapted to achieve the desired overshoot target.

BRIEF DESCRIPTION OF THE DRAWINGS

The foregoing and other objects, features, and advantages of the invention will be apparent from the following more particular description of the preferred embodiment of the invention, as illustrated in the accompanying drawings in which like reference characters refer to the same parts throughout the different views.

DETAILED DESCRIPTION OF THE APPLICATION

The present invention uses performance feedback to update the parameters of a PID controller following each significant control error response to naturally occurring disturbances. Performance is measured using the pattern shape features of the error response, overshoot and decay ratio, which are independent of the amplitude and time scales. The pattern features of an isolated error response provide complete information for updating the control parameters when the response is oscillatory and decay is not equal to overshoot. Targets for the error response features are chosen so that the time scale of the response is optimized when the targets are realized by proper adjustment of the controller parameters such as proportional, integral time and derivative time. It should be noted that the derivative time to integral time ratio may be programmed using the knowledge of type of process to be regulated. The process type can be determined through interpolation or extrapolation of measured integral-time-to-period ratio data with similar data stored for known extreme process types such as pure delay and integral delay. Alternatively, the process type can be declared by the user or operator. Knowledge of the process type is not only used for programmed adaptation of the derivative time but is also used to improve the convergence rate of the proportional band and integral time through interpolation or extrapolation of data relating performance measures to tuning constants for specific process types.

For an oscillatory response, overshoot is calculated from the ratio of two successive peak heights. The decay ratio is the half period peak-to-peak ratio involving three successive peak heights. The derivative time can also be determined by performance feedback using a full period decay ratio involving a peak-to-peak ratio of four successive peaks. However, because this performance measure is very sensitive to noise, programmed adaptation for derivative time based on a measure of process type is preferred.

Furthermore, the present invention makes use of the recognition of a beginning of a response to choose the most appropriate set from stored sets of previously adapted PID tunings. At the end of the response, this set of stored sets of PID tunings is updated. The PID tunings are correlated with error response direction and/or with subranges of a user-specified variable.

Figure 1:
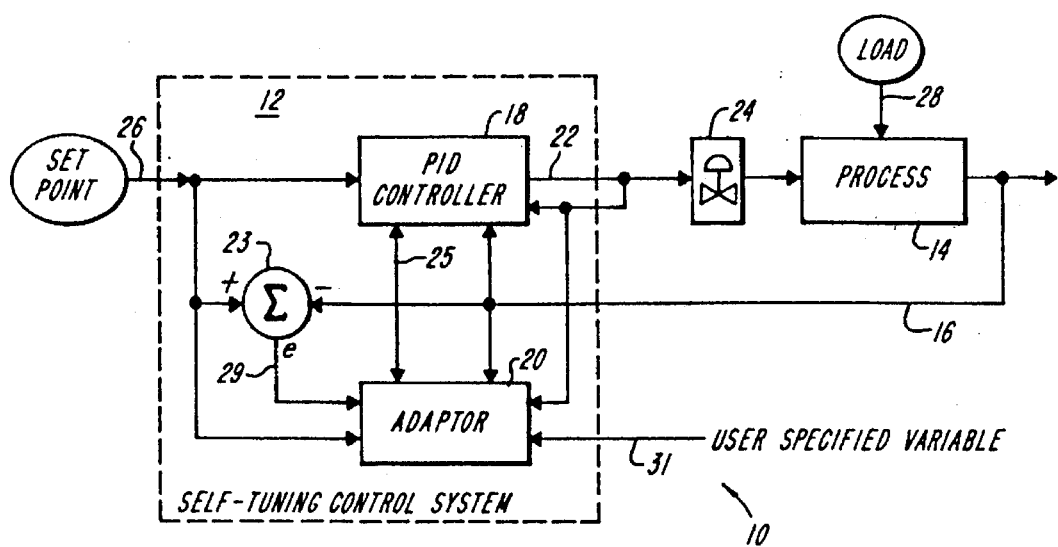
FIG. 1 is a block diagram of an adaptive process control system according to the present invention.

Referring now to FIG. 1, an adaptive process control system 10 includes a self-tuning control system 12 and a process 14 which is characterized by a controlled process variable 16, such as temperature, pressure, level, or concentration. Self-tuning control system 12 preferably consists of a PID controller 18 and an adaptor 20 for automatically adjusting or tuning the control parameters of the controller to optimize the closed-loop performance. Generally, tuning parameters 25 (discussed in greater detail below) are calculated using the values of process controlled variable 16 and a set point 26, the difference between these values (defined as an error signal 29 and produced by a summing amplifier 23), the controller output 22, and a user-specified variable 31. The control parameters are tuning "constants," which may include proportional band (P), integral time (I), derivative time (D) and the lead/lag ratio of a set-point compensator. Using some or all of these control parameters, controller 18 produces a control signal 22, which is received by a control element 24, such as a valve, for regulating process 14.

Process 14 responds to changes in control element 24 such that the value of controlled variable 16 becomes substantially equal to the desired value represented by set point 26 in the absence of load disturbances 28. Thus, the desired result is that process control system 10 be responsive to control error caused by changes in set point 26 or loads 28 on process 14. For example, if the magnitude of the load change is sufficiently large to cause the process 14 to make appreciable changes in the value of the process controlled variable 16, the controller 18, providing its parameters have been well tuned, will respond accordingly with corrective output 22 action to remove the effects of the disturbance. If the error response shape indicates sub-optimal disturbance rejection, the adaptor 20 updates the controller parameters to condition the controller for the next disturbance.

Figure 2:
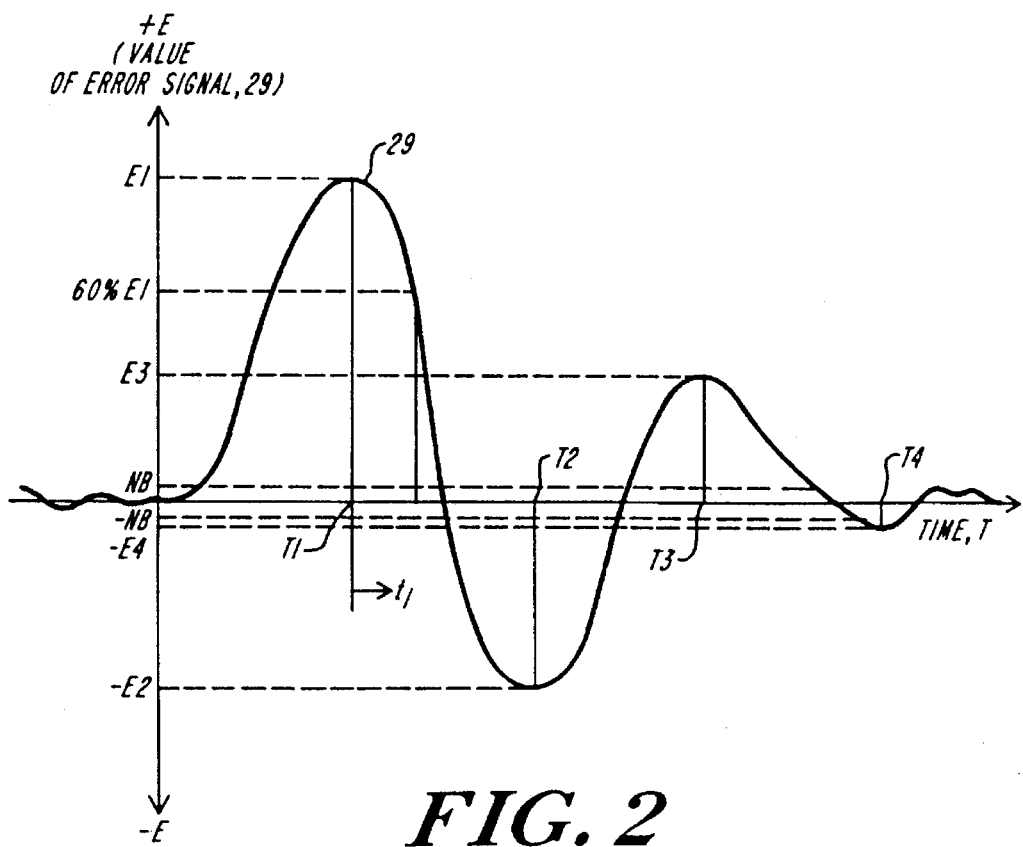
FIG. 2 is an error signal representing a closed-loop response of the adaptive process control system of FIG. 1.

A general description of the adaptive process control system 10 according to the present invention can be best presented in terms of the behavior of error signal 29 as a function of time shown in FIG. 2. This error signal represents the closed-loop response of adaptive process control system 10 to an upset condition which causes a difference between set point 26 and the value of process controlled variable 16. The upset condition depicted is caused by a load disturbance 28 (such as a change in production rate) which significantly disturbs the value of the process controlled variable 16. However, as noted above, the upset could be caused by a sudden change in set point 26. The vertical axis of the plot indicates the measured value (E) of the error signal. The horizontal axis is time (T) with an arbitrary base value. In isolated oscillatory cases, the error signal 29 is characterized by as many as four peaks (also known as local extrema) having peak values E1, E2, E3, and E4 which occur at times T1, T2, T3, and T4, respectively. Eventually, the integral action of controller 18 positions the valve 24 so that the measured value of the error signal becomes substantially equal to zero, which corresponds to the condition where the process controlled variable 16 has returned or changed to its desired value. A noise band (NB) whose value is the expected peak-to-peak variation of the error signal (PPNB) during quiet intervals between isolated upsets and is shown centered on the horizontal time axis. During operations of system 10, the noise band value is adapted as will be discussed below.

Using measured amplitudes of the error signal and times of their occurrence, the closed-loop response of adaptive process control system 10 can be characterized in terms of decay, overshoot, and time period, which are performance measures that are well known to control engineers for describing the behavior of the control loop. These performance measures together with the control parameters, P, I, and D, may then be used to determine the process type, such as a delay process, integral delay (dominant lag) process, or something in between. New control parameters are calculated for driving the decay and overshoot values to target values for that process. Specific details for measuring these performance values and for calculating the proper control parameters will be discussed below.

Figure 3:
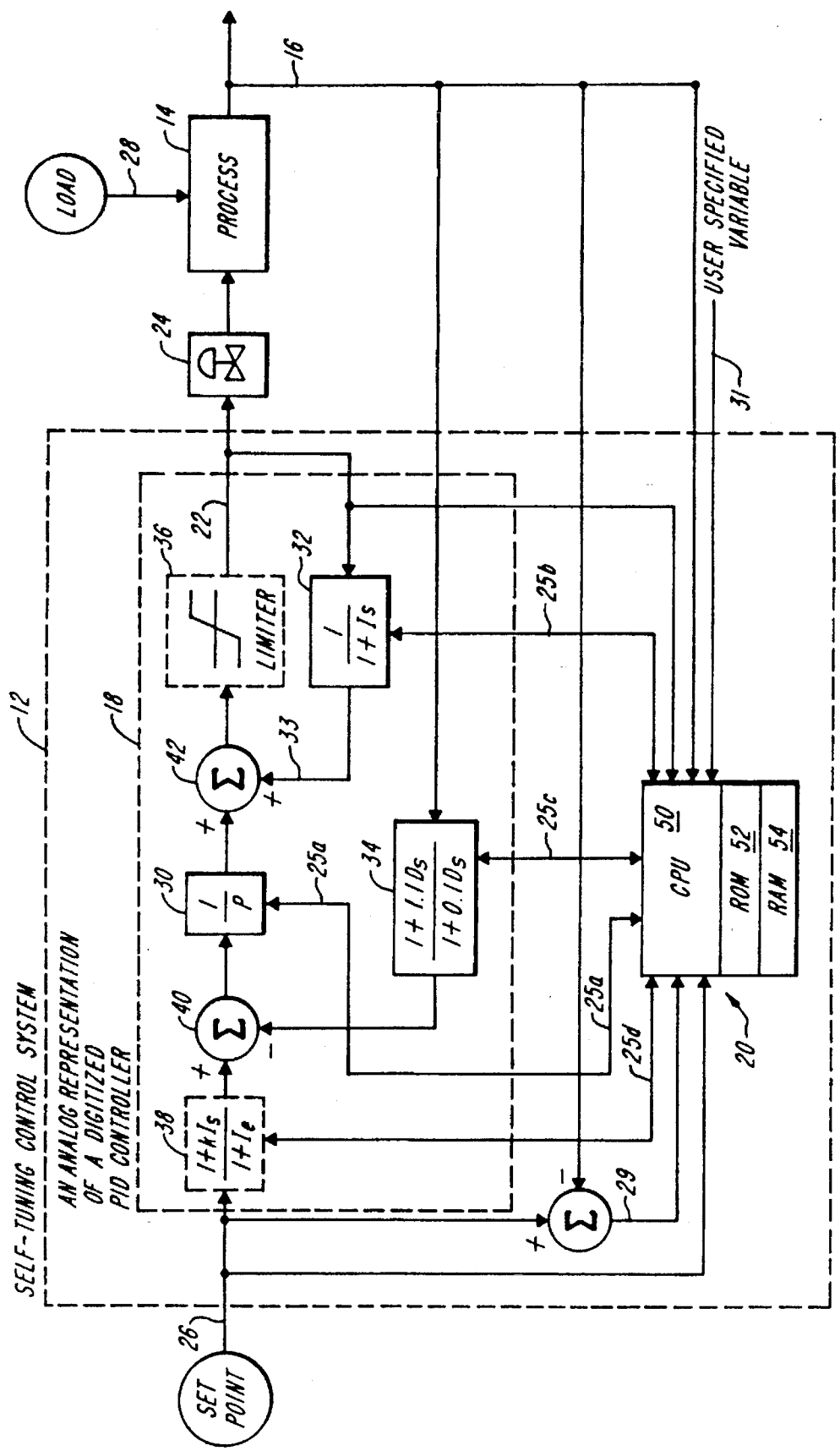
FIG. 3 is a detailed block diagram of the adaptive process control system of FIG. 1.

Referring now to FIG. 3, a more detailed block diagram of a preferred interacting digital type PID controller 18 is shown in terms of an equivalent analog controller element to aid in the explanation of the adaptive control. The PID controller 18 includes four filters: a proportional filter 30, an integral filter 32, a derivative filter 34, and a set-point filter 38. Proportional filter 30 is basically the inverse of the proportional band constant P and is used to determine the responsiveness of controller output 22 to error 29. Integral filter 32 receives an integral feedback input signal which may be the control signal 22 and generates a lagged positive feedback signal 33. Integral filter 32 is a first-order lag filter whose time constant is the integral time constant I. Derivative filter 34 is used in the measurement feedback loop as shown and operates as a lead-lag filter. Derivative filter 34 may include a second order lag term to attenuate high frequency measurement noise and thereby prevent unnecessary valve activity. The proportional, integral, and derivative terms in these filters are the control parameters determined and controlled, via lines 25a–c, by adaptor 20 and are discussed in greater detail below. In the preferred embodiment, controller 18 further includes a limiter 36 which is set to prevent the output 22 from exceeding the range of the control element 24.

During operation of system 10, set point 26 is preferably supplied to controller 18 via filter 38. This filter includes the integral time I, and a "constant" k as shown. As indicated by the phantom lines, filter 38 is not required in a regulator application; i.e., one with a constant set point. However, it is preferred in the present embodiment to prevent a set-point change from causing an excessive overshoot condition, particularly with a dominant lag process. Similar to the other tuning parameters in controller 18, these terms are initially determined by preset, pretuned, or default values and thereafter controlled by adaptor 20 via line 25d.

The output of filter 38 is thereafter combined, via a summing amplifier 40, with the output of derivative filter 34. The resulting signal is then multiplied by the inverse of the proportional constant P of proportional filter 30 and summed, via a summing amplifier 42, with the output of integral filter 32. The sum is then limited if necessary by filter 36 to produce control signal 22 for regulating valve 24. The output of integration filter 32 is a positive feedback signal that provides integral action on the control error when controller output 22 is between the limits of the limiter 36, but prevents integral windup when controller output 22 is at one of the limits. Adaptor 20 monitors controller output 22 to detect output limiting.

It should be clear to one skilled in the art that, instead of using the control signal 22 to directly control the valve, signal 22 could be used as a set point of a secondary controller (not shown). The controlled process variable of that secondary controller would then be fed to integral filter 32 as an external integral feedback signal. Similar to the adaptive process control system described above, the primary process measurement, or measured value, is made available to derivative filter 34 and to adaptor 20 as are the controller's output (or integral feedback) and set point.

A detailed block diagram of adaptor 20 is also shown in FIG. 3 and includes a processor 50 which receives and processes the controller output 22 (or integral feedback), controlled variable 16, set point 26, error signal 29, and the user-selected variable 31, in accordance with software stored in Read Only Memory (ROM) 52 to produce tuning parameters (P,I,D, and k). These parameters are subsequently applied to controller 18 via lines 25a–d. A Random Access Memory (RAM) 54 is provided to contain the data memory and registers required by the microprocessor for implementing the software operations in the ROM.

When processor 50 is first initialized, preset control parameters (which may be stored in RAM 54 or in memory, not shown, of controller 18) are transferred to processor 50. These tuning parameters may have been achieved using a pretuning feature similar to that described in the Kraus patent referenced above or may have been selected by an operator. Other settings are also fed to processor 50 and include a minimum, $W_{MIN}$, and maximum, $W_{MAX}$, wait times for establishing time windows for searching for peak values, an initial noise band NB term and target performance values which can similarly be selected by the operator. The minimum wait time $W_{MIN}$ is used in the confirmation of peaks, which will be discussed below. Typically this value is set to 2 or 3 times the sampling time of the adapter and prevents the system from picking out a peak caused by excessive derivative action. A more detailed discussion regarding these other settings is given below.

Figure 4:
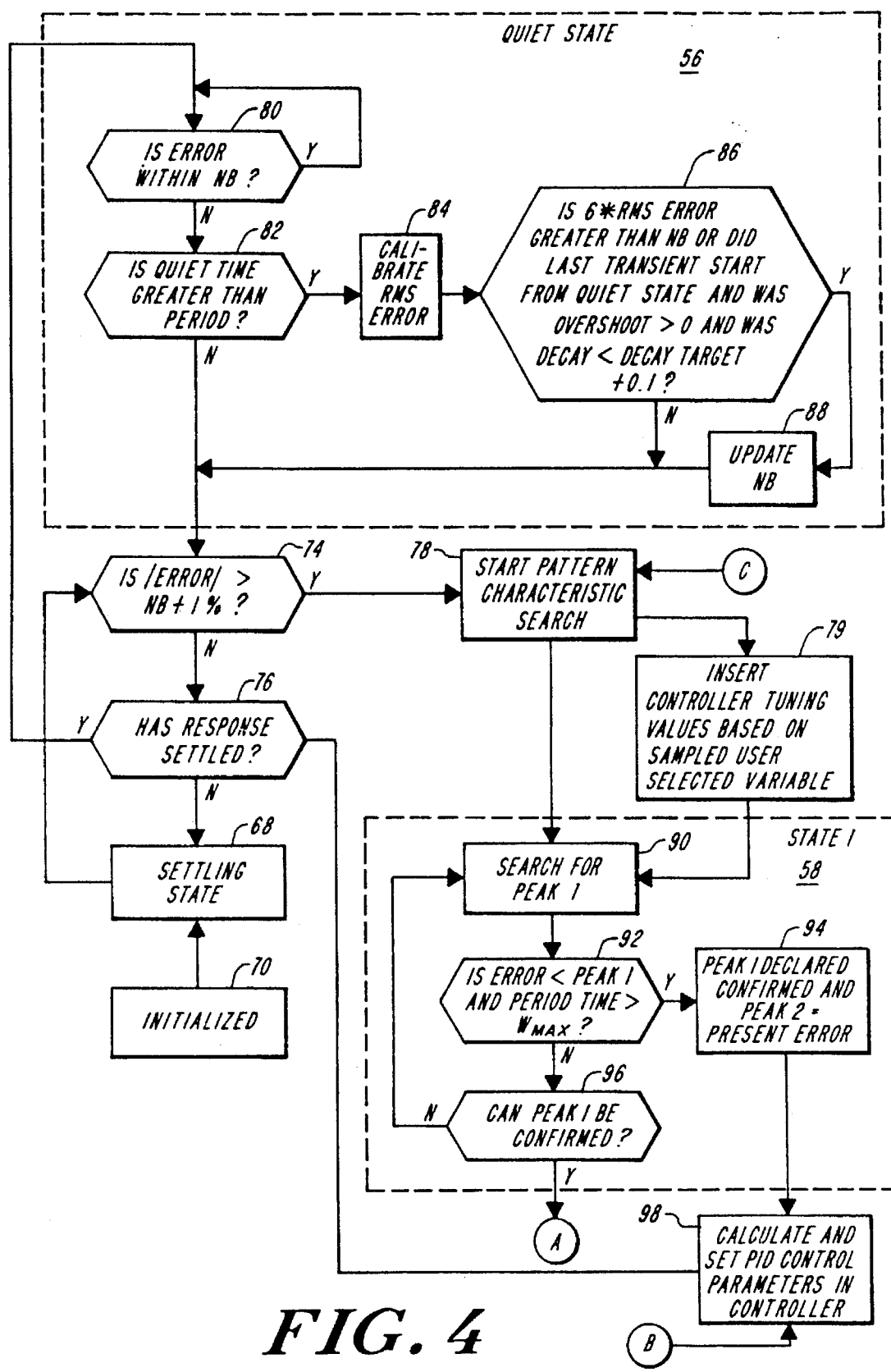
FIGS. 4–6 are flow diagrams indicating the operating states of the processor shown in FIG. 3.
Figure 5:
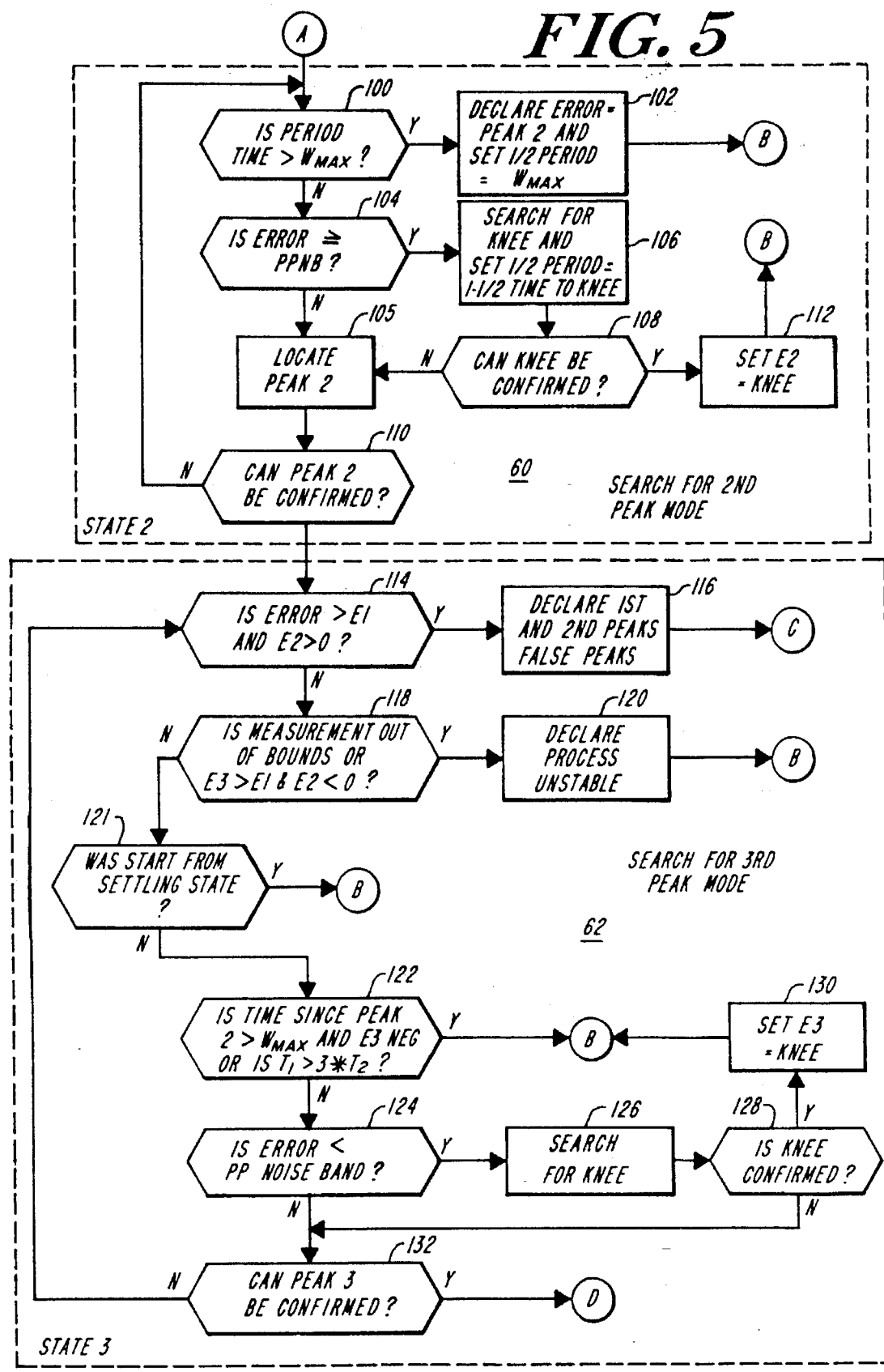
Figure 6:
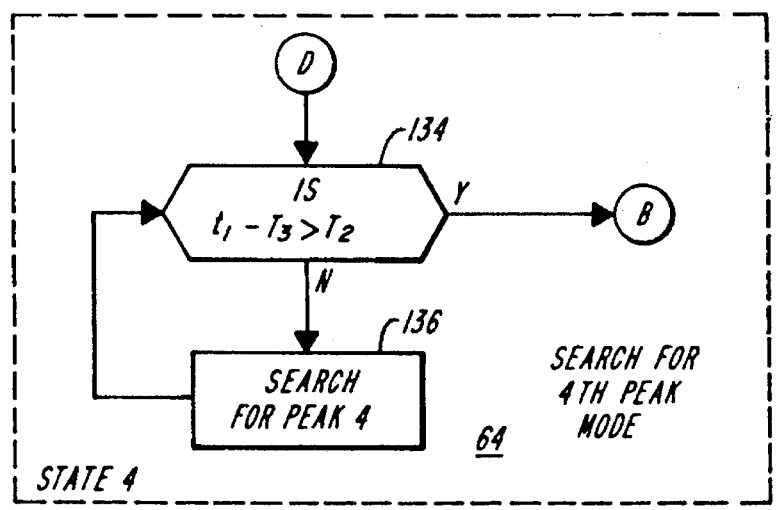

Referring now to the flow diagrams in FIGS. 4–6, the operation of processor 50, after being initialized (Step 70), can generally be described in terms of six primary operating states. The primary operating states include a quiet state 56, four states (States 1–4) in which the processor searches for four consecutive peaks, 58, 60, 62, and 64, and a settling state 68.

Quiet State and Settling State

During quiet state 56 or settling state 68, the processor is looking for a new or continuing transient. If, during the settling state, the error signal remains within the noise band for an adequate time (a half or full period), the settling state 68 is terminated and the processor enters the quiet state 56, Steps 74 and 76.

The distinction between these states is that if the error signal 29 exceeds the noise band plus one percent of the full scale measurement while the processor was in the settling state, then the error signal is declared a continuing oscillation (or an overlapping response). An isolated disturbance is recognized if the response starts from the quiet state. Thereafter, processor 50 begins a search for pattern characteristics of the error signal 29, Step 78.

Referring to FIG. 2, the quiet and settling states are associated with the condition where the measured value of the error signal is between the upper and lower levels of the noise band. So long as the value of the error signal 29 remains between these levels, no new disturbance is recognized and no changes in the control parameters are made. If quiet state lasts at least one period following an adequately damped response, Step 82, the noise band is measured and updated, Steps 84, 86, and 88.

In previous self-adapting systems, the noise band was a fixed value selected by a user or measured during a pretuning phase as an open loop measurement. According to the present method, the noise band is measured under closed-loop conditions and is updated with changing process conditions. The user at any time can insert a value which will override and reinitialize this adapted value.

Updating the noise band requires that the quiet period extend for at least one natural period of the closed-loop as determined during the last upset, Steps 76, 80, and 82. At startup, the period timer is set equal to the maximum wait time, $W_{MAX}$, selected by the user or a pretune specified wait time. The noise band is updated if one of the two following criteria is satisfied:

1. The new noise band value is less than the previous noise band value; or
2. 
   a) The previously determined overshoot value is greater than or equal to zero; and
   b) the error is not a continuing oscillation (that is the last observed oscillation started from a quiet condition); and
   c) the previous measured decay ratio is less than or equal to the decay ratio target plus 0.1.

Note that satisfying the second criterion permits the noise band to be updated to larger or smaller values. The new peak-to-peak noise band is calculated as the root-mean-square (RMS) value of the measured noise (that occurred during the quiet period) times an arbitrary factor, which is preferably set to six standard deviations, Steps 84, 86, and 88. These criteria are imposed to assure that the loop was neither overdamped nor too underdamped when the noise band is allowed to increase.

Search for First Peak

Once the error signal 29 crosses a threshold related to the noise band, Step 74, the processor enters the first of four states for locating peaks or amplitudes which will be used as if they were peaks of the error signal. In the preferred embodiment, this threshold is set equal to the noise band plus one percent of the measurement range. The first state 58 includes initializing a period timer (a counter incremented with each new error sample), determining the sign of the error signal, and searching for the first peak of the error signal, Step 90. For convenience, if the sign of the error signal is initially negative, it is sign corrected such that the initial deviation from the noise band of the sign corrected error is positive. Further, when the error signal is first detected, the uncorrected error sign and the user-selected variable 31 are used to indicate the likely process operating condition for the new response. Based on the value of initial error sign and/or the selected variable, stored tuning values which best exploit past experience in coping with this process operating condition are inserted into the controller, Step 78.

An appropriate user-selected variable can include the set point 26 or a measured load 28 which anticipates the new final operating condition. For example, the set point can be used as the user-selected variable as an indicator of the future settled value of the process controlled variable. For example, if the nonlinear process behavior is most dependent on the value of the controlled measurement, the set point (which anticipates the controlled variable) should be selected. For another process, a measured load variable (or the controller output) may be a better choice. By selecting the most appropriate among successful past tunings, the system is better able to cope with process nonlinearity. This is a form of adaptive gain scheduling determined by performance feedback rather than open loop programming based on an identified or specified process model.

In the preferred embodiment, previous sets of adaptive tuning parameters, P, I, D and lead-lag ratio are stored and indexed according to the error response direction and magnitude values of the user-selected variable. The range of the user-selected variable may be subdivided and indexed into several subranges. For the preferred embodiment, the range of the selected specified variable is divided into three subranges, such that for each subrange there are two sets of tuning PID parameters (the set to be used depends on the initial sign of the error signal and the subrange of the user-selected variable). These tuning values are selected and updated to exploit and improve upon past experiences in coping with new disturbances. Of course this concept could be extended to multiple subranges of several variables. Further, it should be noted that the user may elect to select no variable. Then the selected set of tunings would depend on initial error sign alone. For example, the user would not select a variable if the process is linear.

The first peak, E1, is located by comparing the current magnitude of the measured error signal to a previously measured value, hereinafter referred to as a tentative first peak. If the current magnitude of the measured error signal is greater than the tentative first peak, then the value of the tentative first peak is replaced with the magnitude of the currently measured error signal and the period timer is reset to zero. This new tentative value is then compared with successively measured magnitudes of the error signal. This recursive step continues until the maximum wait time, $W_{MAX}$, expires or when the tentative first peak is confirmed as a bona fide peak. If time since the tentative first peak exceeds $W_{MAX}$ before the first peak is confirmed, then the tentative first peak is declared confirmed and the last measured error value is declared to be an unconfirmed second peak, E2, Steps 92 and 94. This criterion is used to stop the peak search when the controller has very sluggish tuning. Processor 50 then uses this incomplete information to make the PID tuning less sluggish, Step 98, as will be discussed below.

Before the peak timer reaches $W_{MAX}$, an attempt is made to confirm that the tentative peak is the first peak, E1, and not a noise artifact, Step 96. Table 1, set forth below, lists the preferred criteria for confirming peaks. These criteria are selected to reject local noise peaks and short-period peaks caused by excessive (mistuned) derivative action. Note that $t_{MIN}$ is the minimum value that the period timer $t_1$ may achieve after the first peak before starting information gathering for a particular peak. This "wait" time may be used to avoid detecting some of the high frequency oscillation peaks that may be the result of derivative action misapplied to a pure delay process. As indicated, if the difference between the tentative first peak and the current error exceeds the noise band and the current error is less than 0.6 times the tentative first peak, the first peak is confirmed. The method described above for locating and confirming the first peak will also be used in locating and confirming other peaks.

Search for Second Peak

Figure 7:
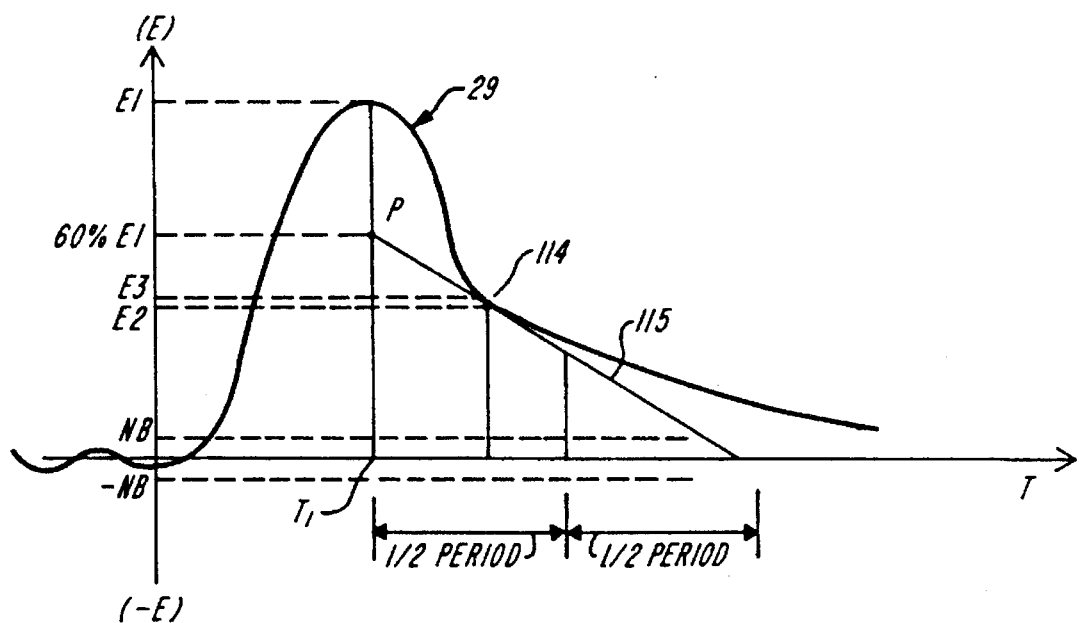
FIG. 7 shows an error signal having a knee which indicates an overdamped response that has only one peak that can be located and confirmed.

Assuming that the first peak has been located and confirmed, processor 50 enters state 2, generally indicated by Steps 100 to 112 (FIG. 5). Initially, the period timer, $t_1$ is set to zero at the first peak E1 and is used for measuring the time since the first peak. If this timer exceeds $W_{MAX}$, the tentative second peak value will be used as the second peak E2 and the controller tuning is tightened to speed up this sluggish behavior, Steps 100 and 102. In this state, processor 50 is searching for an amplitude which may be a second peak E2 or a knee 114 in the error curve (as shown in FIG. 7), which may be used as if it were an unconfirmed second peak. A knee is a pattern feature of an overdamped response that has only one peak (E1).

A tentative knee is located at a point on a tangent 115 drawn through the error-response 29 and a point having a 0.6 amplitude of the first peak E1 at $t_1=0$. A tentative half period is chosen as 1.5 times the time from the first peak to the tentative knee, Step 106. A time interval equal to two times this tentative half period is used to search for and confirm the second peak. This maximum search time is independent of a previous response measurement or a preset wait time as disclosed in Kraus. Thus, a finite search time interval for locating the second peak is established even when a second peak exists. The tentative knee is abandoned if the error response 29 becomes less in magnitude than the negative noise band because a second peak can then be located. The tentative half period is then revised to be the time between the first peak and the tentative second peak. If, however, after two tentative half periods a second peak has not been confirmed, the search for peaks is terminated and the PID calculations are entered, Step 102. The knee is confirmed and used in the PID calculations as the unconfirmed second peak, if during the $W_{MAX}$ interval the amplitude difference between the currently measured error response 29 and a corresponding point on the tangent 115 equals the magnitude of the noise band, Steps 108 and 112.

TABLE 1

TEST FOR PEAK CONFIRMATION

1. The currently measured error response is closer to zero than 0.6 * peak being compared.
2. The currently measured error response is at least NB closer to zero than the peak being confirmed.
3. Sufficient time since the last peak has elapsed for the start of confirmation of the following peaks:
   a) $t_{MIN} = 0$, for the first peak, E1;
   b) $t_{MIN} = W_{MIN}$, for the second peak, E2; and
   c) $t_{MIN}$ = twice the time interval between E1 and E2, for the third peak, E3.

Search for Third Peak and Fourth Peak

When a second peak is confirmed, the search for a third amplitude, which again may be a peak or a knee, is begun (state 3). The same procedure used for locating the second peak, described above, is followed, except that the confirmed half period is not further revised. If, during the search, the third tentative peak exceeds the first peak and the second peak is also positive, the first two peaks are abandoned and the search for a first peak is again initiated, Steps 114 and 116. If the process controlled variable exceeds its range during the search for the third peak, the search is terminated and the violated range limit is used as the unconfirmed third peak estimate in the new PID calculations, Steps 118 and 120. Alternatively, if the tentative third peak is greater than the first, but the second peak is negative and the product of the first and third peaks is not less that the square of the second peak, the response is considered unstable, Step 120, and the search for peaks terminated and new PID calculations based on this information entered. If, however, the response started from the settling state rather than the quiet state, indicating a continuing or overlapping response, the search for a third peak is terminated and PID tuning parameters calculated using this information are entered into the controller, Step 121.

Two half periods after the second peak are allowed to confirm the third peak. If it is not confirmed in this time, the search is terminated and appropriate PID calculations are entered. Providing time since the second peak does not exceed two half periods and error signal 29 remains negative, processor 50 searches for a knee in the same manner described above, Steps 122, 124, and 126, using the magnitude of the second peak. If the knee value can then be confirmed, it will be used as the unconfirmed third peak, Steps 128 and 130.

Providing the third peak is confirmed, a fourth peak will be sought in the same manner described above for a half period after the third peak, Steps 134 and 136 (state 4), FIG. 6. In the preferred embodiment, if the tentative fourth peak value is less than the second peak value, confirmation of the third peak is withdrawn and new PID tunings are calculated based on this information, which indicates that the process is oscillating out of control. There is no attempt to confirm the fourth peak.

Calculation of New Control Parameters

Using the measured amplitudes, values for pattern features of the error signal can be determined and used to update the set of PID control parameters for the just-completed responses, Step 98 (FIG. 4). The half-period (T) and dimensionless pattern features which include overshoot (OVR) and decay are determined according to the equation set forth below.

$$OVR = -E_{(2+N)}/E_{(1+N)} \quad (1)$$

$$DECAY = \frac{E_{(3+N)} - E_{(2+N)}}{E_{(1+N)} - E_{(2+N)}} \quad (2)$$

$$T = T_{(2+N)} - T_{(1+N)} \quad (3)$$

The variable N depends on the number of peaks that were located and skipped before selecting three successive amplitudes to calculate the above pattern features. Skipping peaks will be discussed in greater detail below. If the fourth peak E4 is lost in the noise band or a fifth peak is needed, a peak can be estimated according to the formula set forth below.

$$E_{(3+N)} = \frac{E_{(1+N)} * E_{(2+N)}}{E_{(N)}} \quad (4)$$

This equation is based on the assumption that the error signal is exhibiting a near optimal decay where the real parts of the three dominant closed-loop poles are identical.

Figure 8:
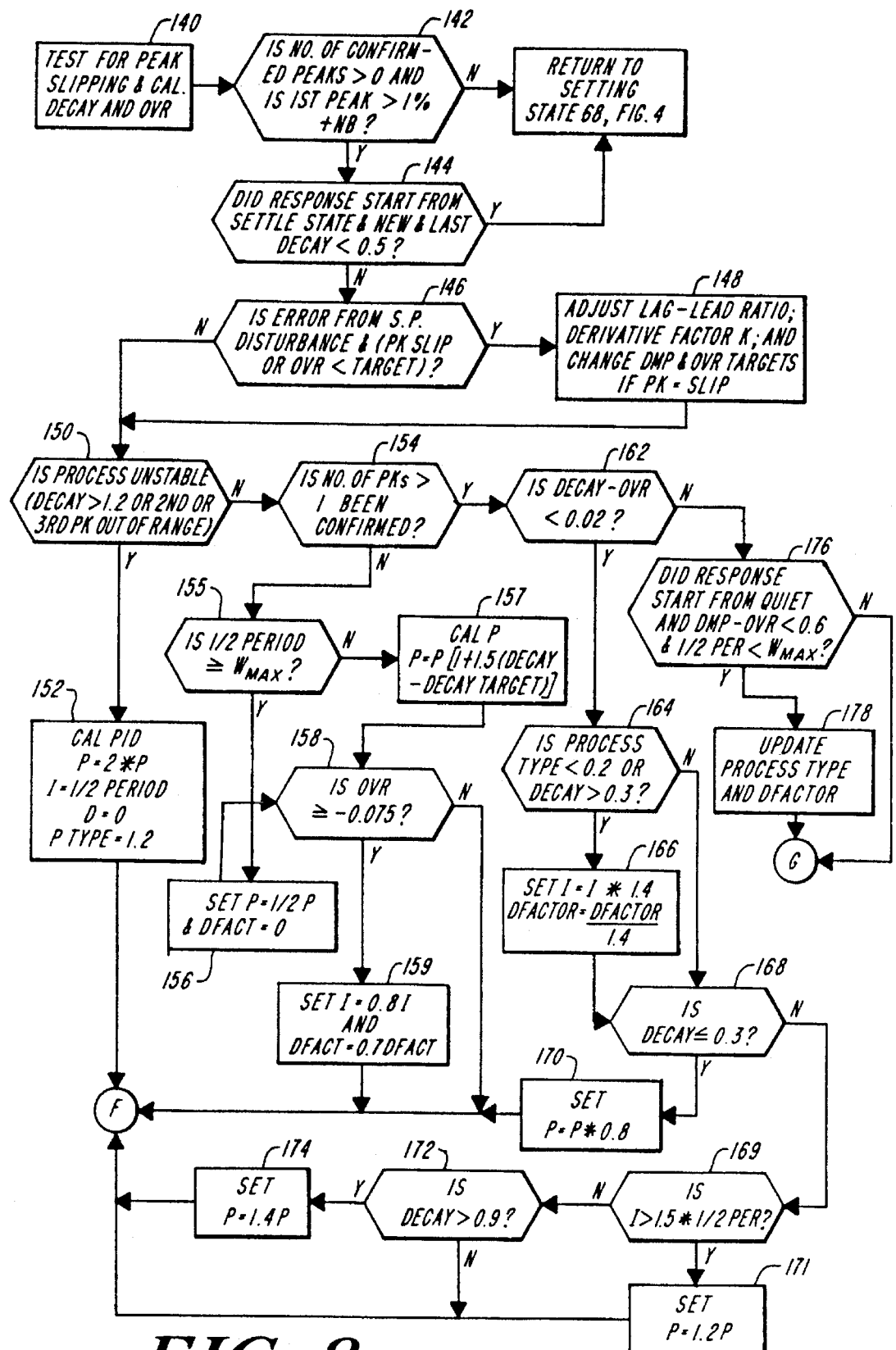
FIGS. 8 and 9 are flow diagrams indicating the operation of the processor for determining corrective control parameters for the process.

The set of successive peaks that will be used for updating the control parameters is determined by comparing the values of decay and overshoot based on the first set of three peaks located by processor 50 (N=0), Step 140, FIG. 8. If decay is less than overshoot, then processor 50 will "peak slip;" i.e., calculate new values for decay and overshoot, based on the next set of three peaks (N=1), and determine if a second peak slip (N=2) is necessary. In other words, peak slipping implies that the second peak will be declared the first peak, the third peak will be declared the second peak, and so on, for the purposes of selecting successive peaks that will be used to calculate new decay and overshoot values for determining corrective control parameters. More simply, if:

$$E_{(1+N)} * E_{(3+N)} < E_{(2+N)}^2, \quad (5)$$

then there is a peak slip.

Once an N is found where the first product of equation 5 is larger than or equal to the second product, the first of the three successive peaks used may be tested to determine if it would trigger a peak search. It should be greater than one percent of the full-scale controlled variable plus the noise band in order to calculate the PID control parameters, Step 142. If this condition is not met, there is no PID update because the response is not large enough and the adaptor is switched to the settling state. However the set-point compensator factor k, may be adjusted, based on the overshoot prior to peak slipping, provided that the error response was initiated by a set-point disturbance. The set-point compensator factor k ranges from 0.2 for a dominant-lag process to 1.0 for a dominant delay process. This factor is decreased by the amount of overshoot which exceeds the target overshoot prior to peak slipping. This factor is increased following a sluggish isolated set-point response (negative overshoot) by an amount equal to the overshoot deviation. The decay and overshoot targets are also appropriately adjusted (temporarily) after a peak slip, but before P, I, and D are updated, Steps 144, 146 and 148. The adjustment is made so that there will be no change in the PID tuning if the process is disturbed either by an impulse requiring peak slipping or a step requiring no slipping.

At this point, overshoot, decay, and integral-to-half-period ratio of the error signal have been determined and can now be used to classify the PID adjustment process into categories based on the completeness of information that can be obtained from the error signal. A first category, generally indicated by Steps 150 and 152, deals with information in the following way. If the value of decay is greater than 1.2 or the second or third peak is beyond the measurement range, the control loop is recognized as grossly unstable, Step 150. For this case, the proportional term is doubled, the integral term is set equal to the half period, and the derivative term is set equal to zero, Step 152. The process type (ptype) is also set equal to 1.2.

A second category deals with information which indicates an overdamped response with only one confirmed peak and is generally indicated by Steps 154 to 159. If the half-period is greater than or equal to $W_{MAX}$, the proportional term is halved and the derivative factor is set to zero, Steps 155 and 156. Otherwise, the proportional term is updated according to the following recursive formula, Step 157.

$$P = P * (1 + 1.5(DECAY - DECAY\ TARGET)) \quad (6)$$

Further, the integral time is multiplied by 0.8, if the overshoot is less than minus 0.075, Steps 158 and 159.

Note that for this case, the unconfirmed second peak E2 was either the knee 137 or the lowest value found during the search for the second peak E2. Further, since the third peak E3 cannot have an amplitude more than the peak-to-peak noise band (PPNB) above the unconfirmed second peak E2, decay is calculated based on this extreme case (provided decay does not exceed its target). This will cause the proportional band to be larger than it would have been had the decay been assumed zero in equation 6. As a result, the control is not overly tightened when the response is so small that the second and third peaks cannot be distinguished from noise.

A third category is generally indicated by Steps 162 to 174. This case occurs when the decay minus overshoot is less than 0.02, which indicates that the closed-loop response is close to being that of a damped quadratic, Step 162. The proportional and integral terms are calculated as follows. If the process type is less than 0.2, which is a measure that is between a pure delay and an integral delay (i.e.. close to a pure delay) as determined during an earlier adaptation or set by the user, or decay is greater than 0.3, the integral term is multiplied by 1.4, Steps 164 and 166. The determination of the process type will be discussed in greater detail below. The derivative factor, a factor applied to the integral term to determine the derivative time, is divided by 1.4 to keep the derivative time unchanged. If the decay is less than or equal to 0.3, then the proportional term is multiplied by 0.8, Steps 168 and 170. Otherwise, if the integral term is greater than one and one-half times the half period, the proportional term is multiplied by 1.2, Steps 169 and 171. If decay is greater than 0.9, then the proportional term is multiplied by 1.4, Steps 172 and 174; otherwise, the proportional term remains unchanged.

If the PID adjustment process has not already been categorized as having incomplete information, according to the three categories above, then the processor determines whether the response started from a quiet state, decay minus overshoot is less than 0.6, and the half period is less than $W_{MAX}$, Step 176. If these criteria are satisfied, then the process type is updated based on the new information judged to be complete, Step 178. The process type can change from 0.0 for a pure delay to 1.0 for an integral delay and even larger for a statically unstable process. According to the preferred embodiment, the process type, ptype, is determined from the following equation:

$$\ln(I/T) = \text{ptype} * \ln(I/T)\text{integral} + (1 - \text{ptype}) * \ln(I/T)\text{delay}. \quad (7)$$
$$\text{measured} \quad \text{delay}$$

The ratio in(I/T) on the left hand side of the equation (7) is known because I is the current integral time controller value and T is the measured half-period. The ratios, ln(I/T), on the right-hand side of equation (7) for the integral-delay and delay processes respectively, are interpolated from ratio values stored in ROM 52, FIG. 3. In the preferred embodiment, a total of 27 ratio values are stored for each of the three extreme process controller combinations shown in the plots of Figs. 10 through 12. These ratio values, include ln(P/Po), ln(I/Io), and ln(I/T) at each of nine points labeled A-I, on the plots shown in FIGS. 10 through 12 for PI and PID control of pure delay and integral-delay processes. (PI and PID control of pure delay process are combined in FIG. 10 since the optimal derivative term D is zero.) These ratios have been predetermined experimentally. The zero subscript refers to a reference point, A, arbitrarily selected to have 0.1 overshoot and 0.2 decay. The proportional band P, integral time I, and D/I ratio are values needed to achieve the measured decay and overshoot values. It should be noted that experimental data generated using other ratios conveying similar information can be used. Further, although these data points are evenly spaced in the decay and decay-minus-overshoot planes, other spacings as well as a different number of points can be selected for the purposes of interpolation or extrapolation.

Figure 10:
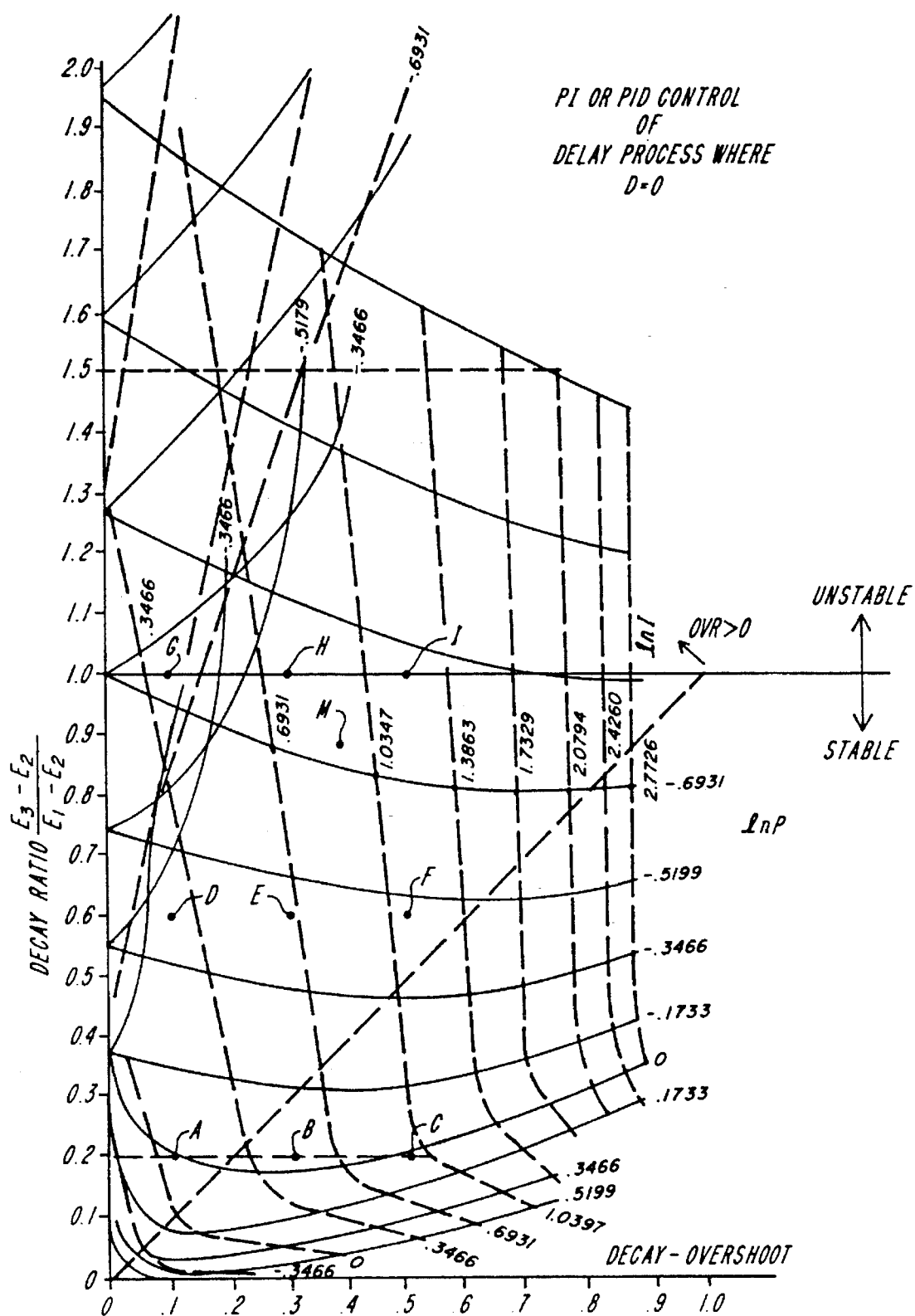
FIGS. 10–12 are performance maps generated from experimental data for PI control of a pure delay process, an integral delay process and PID control of an integral delay process.
Figure 11:
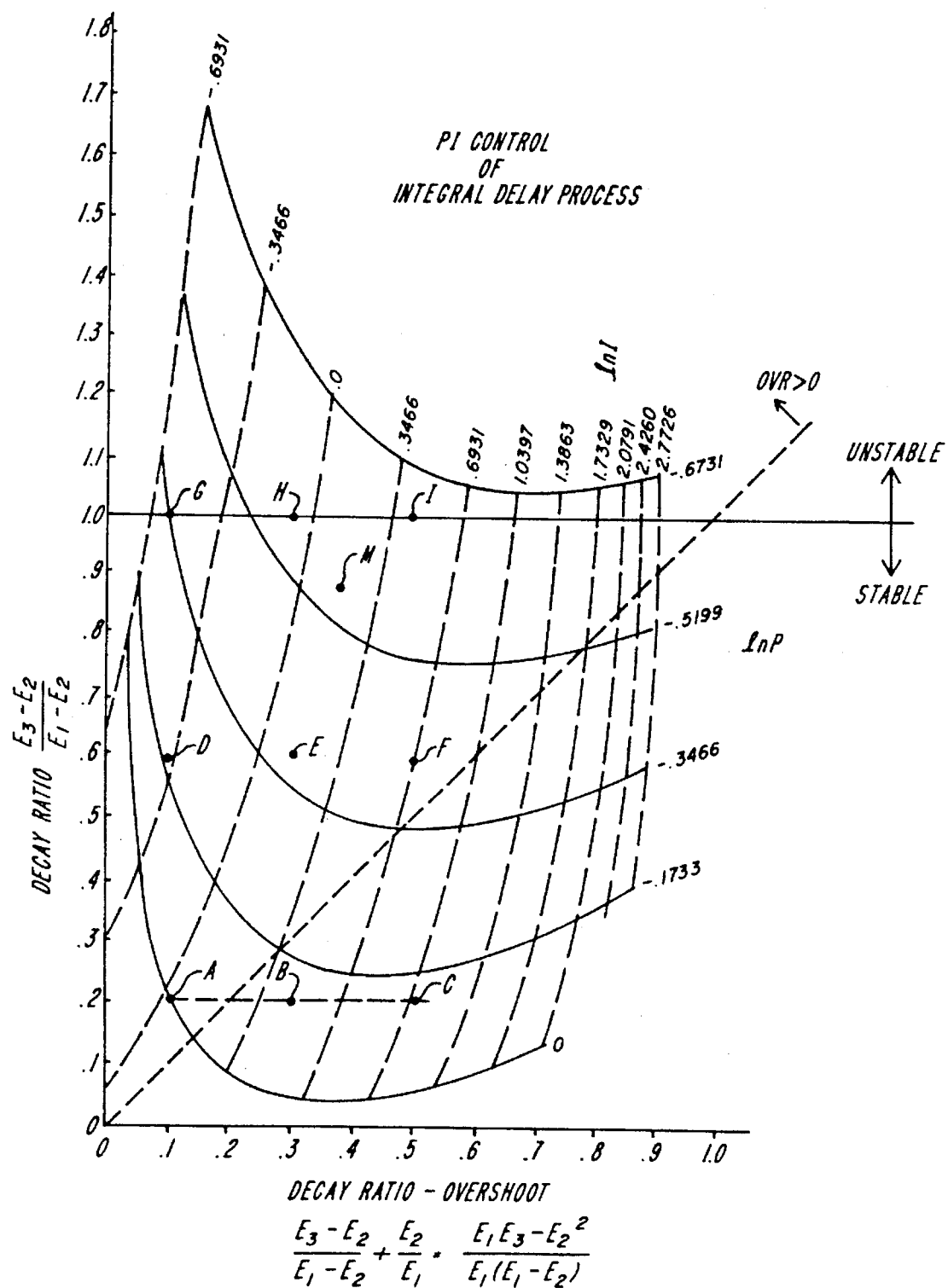
Figure 12:
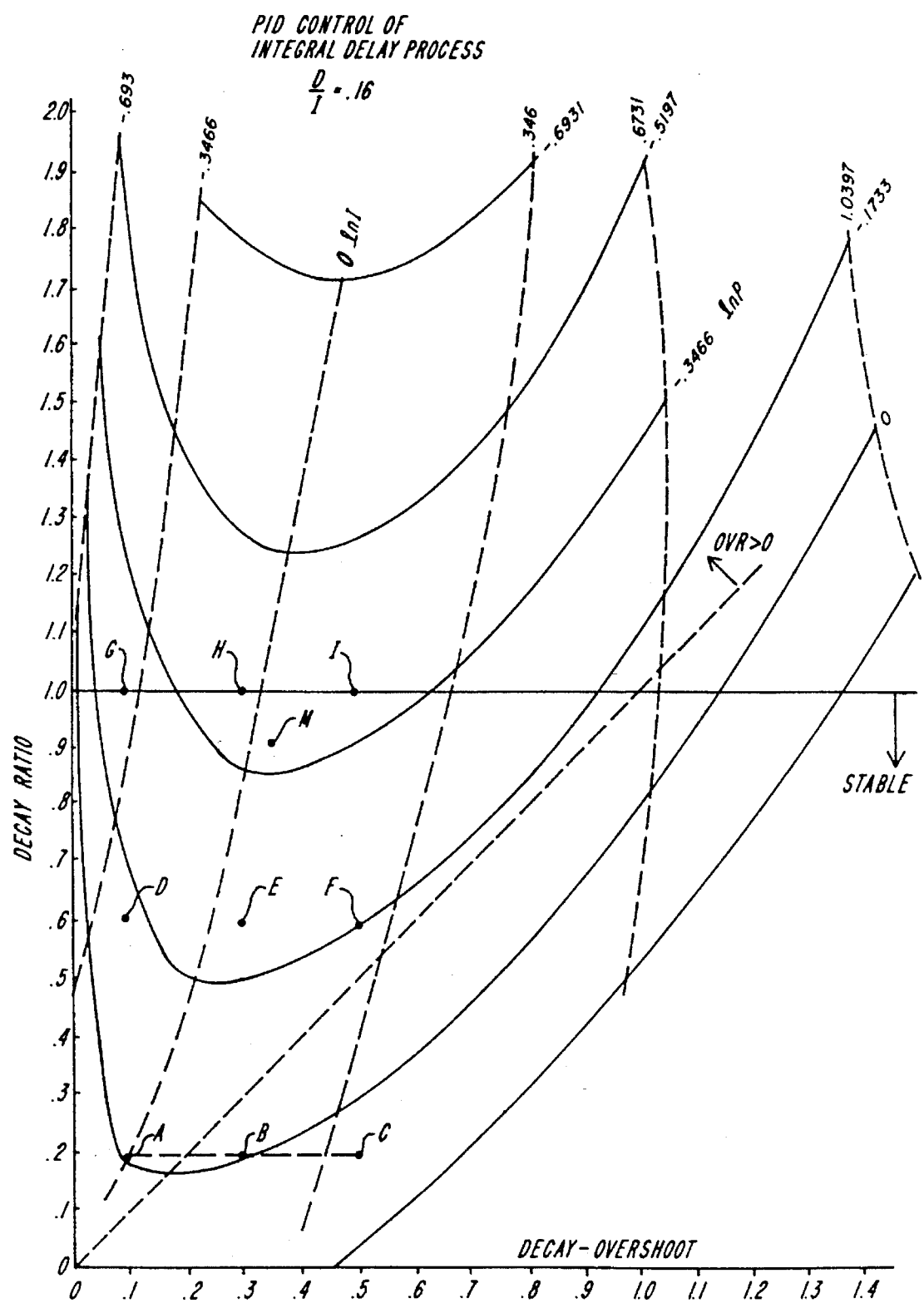

Using the measured decay and overshoot of the process, a point M, for example, can be plotted on the three graphs shown in FIGS. 10 through 12. Using biquadratic interpolation, which is known to those skilled in the art, the weighting function associated with each of the stored data points is determined and used to find the set of ratios $\ln(P/P_o)$, $\ln(I/I_o)$ and $\ln(I/T)$ for each process controller combination. Biquadratic interpolation was chosen because the curves generated by the experimental data resembled parabolas. If the controller is to have no derivative action, the stored data values of ln(I/T) at the indicated points labeled A-J in FIGS. 10 and 11 can be used to determine the process type (ptype) using equation (7) above.

Figure 9:
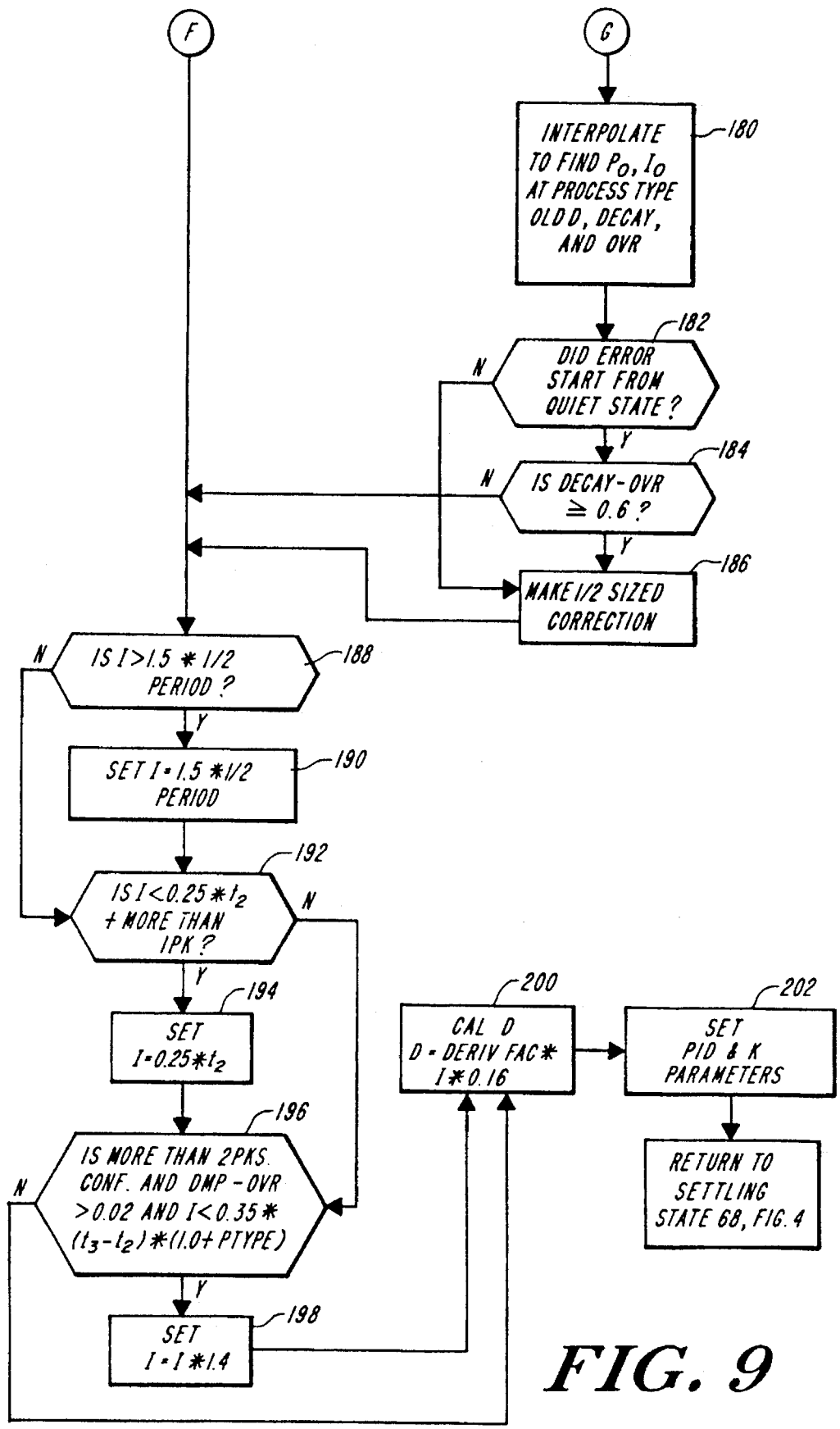

Knowing the current integral time, I, and proportional band, P, the process type, and the ratios $\ln(P/P_o)$ and $\ln(I/I_o)$ for both the integral-delay and delay process now permits the processor to calculate the proportional band, $P_o$, and integral time, $I_o$, necessary to move the current decay and overshoot values to the respective decay and overshoot values at the reference point A (0.1 overshoot and 0.2 decay). Note that the overshoot and decay values at reference point A is chosen as the preferred target values. These new parameter values are calculated by solving for $P_o$ and $I_o$ in the left-hand side of equations 8 and 9 respectively, Step 180, FIG. 9.

$$\ln\left(\frac{P}{P_O}\right) = \text{ptype} * \ln\left(\frac{P}{P_O}\right)_{\substack{\text{intergral}\\\text{delay}}} + (1 - \text{ptype}) * \ln\left(\frac{P}{P_O}\right)_{\text{delay}} \quad (8)$$

$$\ln\left(\frac{I}{I_O}\right) = \text{ptype} * \ln\left(\frac{I}{I_O}\right)_{\substack{\text{intergral}\\\text{delay}}} + (1 - \text{ptype}) * \ln\left(\frac{I}{I_O}\right)_{\text{delay}} \quad (9)$$

If the user selects target decay and overshoot values different from the reference values, the proportional band $P_T$ and integral time $I_T$ can be calculated according to the following with P and I of equations 8 and 9 replaced by $P_T$ and $I_T$. Then $P_o$ and $I_o$ can be eliminated as indicated by the following equations:

$$\ln\left(\frac{P_T}{P_O}\right) - \ln\left(\frac{P}{P_O}\right) = \ln\left(\frac{P_T}{P}\right) = r_1; \quad (10)$$

$$P_T = P\, e^{r_1}; \quad (11)$$

$$\ln\left(\frac{I_T}{I_O}\right) - \ln\left(\frac{I}{I_O}\right) = \ln\left(\frac{I_T}{I}\right) = r_2; \text{ and} \quad (12)$$

$$I_T = I\, e^{r_2}, \quad (13)$$

For the above calculations it was assumed that there was no derivative term D. If the controller is to have derivative action, it is first necessary to interpolate or extrapolate the data from FIGS. 11 and 12 using a derivative factor (dfact), which will be explained shortly, in order to get values for:

$$\ln\left(\frac{P}{P_O}\right)_{\text{intergral, delay}}, \ln\left(\frac{I}{I_O}\right)_{\text{intergral, delay}}$$

$$\ln\left(\frac{I}{T}\right)_{\text{integral delay}} \quad (5)$$

used in equations 7 through 9.

Using these interpolated ratio values the new control parameters that will move the measured damping and overshoot values to target values are calculated in a similar manner as above using the following equations. For measured conditions, dfact is the ratio of D to I.

$$\ln\left(\frac{I}{T}\right)_{\text{integral delay}} = \text{dfact} * \ln\left(\frac{I}{T}\right)_{\text{integral delay, PID}} + \quad (14)$$

$$(1 - \text{dfact}) * \ln\left(\frac{I}{T}\right)_{\text{integral delay, PI}}$$

$$\ln\left(\frac{P}{P_O}\right)_{\text{integral delay}} = \text{dfact} * \ln\left(\frac{P}{P_O}\right)_{\text{integral delay, PID}} + \quad (15)$$

$$(1 - \text{dfact}) * \ln\left(\frac{P}{P_O}\right)_{\text{integral delay, PI}};$$

$$\ln\left(\frac{I}{I_O}\right)_{\text{integral delay}} = \text{dfact} * \ln\left(\frac{I}{I_O}\right)_{\text{integral delay, PID}} + \quad (16)$$

$$(1 - \text{dfact}) * \ln\left(\frac{I}{I_O}\right)_{\text{integral delay, PI}},$$

For target conditions, the new derivative factor, dfact, may be scheduled using an empirically determined relationship for D/I with ptype, Step 178. If ptype is less than 0.03 (a dominant delay process) the dfactor is permanently clamped to zero until the user overrides this decision; otherwise, if the overshoot is greater than zero:

$$dfact = 2.2 - 1.25 * ptype \quad (17)$$

If both the measured decay and overshoot were equal to their target values, the interpolation method would indicate no change in proportional band or integral time, even though there may have been a change in the derivative factor. A correction is made based on the shift in reference value, $P_o$ and $I_o$ with and without derivative action in the controller for an integral-delay process. This correction is proportioned, based on the product of the dfact change and ptype.

If the error signal started from the settling state or decay minus overshoot is greater than 0.6, then the parameter changes are divided by 2, Steps 182, 184 and 186.

To recover quickly from a grossly mistuned condition, the integral time is adjusted to fall in an expected range relative to the half period. The criteria for determining this condition are set forth in Steps 188 to 198. If overshoot is greater than zero, the integral time is not allowed to exceed 1.5 times the half-period, Steps 187, 188, and 190. If at least one peak is confirmed, the integral time is forced to be at least 0.25 times the half-period, Steps 192 and 194. Also if three peaks have been confirmed, the response is not dominated by the quadratic term, and the integral time is less than 0.35 times (1.0+ptype) times the time between peaks two and three. The integral time is multiplied by a factor of 1.4, Steps 196 and 198. These steps prevent the integral time from becoming too small when the disturbance is applied gradually. The derivative is thereafter calculated by multiplying the derivative factor times the integral value times 0.16, Step 200.

However, the derivative time is not allowed to exceed 0.25 times the half-period. The control parameters are then updated in controller 18, FIG. 3, Step 202. The processor thereafter returns to the settling state 68, FIG. 4.

While the invention has been particularly shown and described with reference to a preferred embodiment thereof, it will be understood by those skilled in the art that various changes in form and details may be made therein without departing from the spirit and scope of the invention, as defined by the appended claims. For example, a similar scheme can be applied to a non-interacting PID controller.

We claim:

1. A method claim for automatically adjusting the control parameters of a self-tuning controller used to regulate a process having a measured process variable signal, comprising the steps of:

generating an error signal representing a closed-loop response of the process to an upset condition;

measuring amplitude values of local extrema of said error signal;

selecting three successive amplitude values of said local extrema (E1, E2, and E3) such that the square of the second extremum (E2) is less than or equal to the first extremum (E1) times the third extremum (E3);

producing at least one measured performance characteristic by combining said successive local extrema; and automatically adjusting at least one of the control parameters of the controller to improve the difference between said at least one measured performance characteristic and a target performance characteristic.

2. The method of claim 1, wherein said step of combining includes producing an overshoot value as one of said set of performance characteristics.

3. The method of claim 1, wherein said step of combining includes producing a decay value as one of said measured performance characteristics.

4. The method of claim 1, wherein the step of measuring the amplitudes includes locating and measuring a knee of said error signal, later in time to a first local extremum.

5. The method of claim 1, further including the step of measuring an error noise and updating a noise band during a quiet state of said error signal.

6. The method of claim 1, further including the step of filtering said set-point signal with a lead-lag filter to prevent an excessive error overshoot in response to a set-point change when the controller is well tuned for a load upset.

7. The method for automatically adjusting the control parameters of a self-tuning controller used to regulate a process having a measured process variable signal, comprising the steps of:

generating an error signal representing a closed-loop response of the process to an upset condition;

measuring first and second amplitude values characterizing the pattern features of said error signal, wherein said second amplitude value is a knee of said error signal, to produce a measured overshoot characteristic of said error signal;

selecting a decay characteristic value determined from the smaller of a target decay value or a calculated decay value using said amplitudes; and automatically adjusting at least one of the control parameters of the controller to improve the difference between one of said measured characteristics and a target characteristic.

8. The method of claim 7, wherein said calculated decay characteristic value is equal to a measured noise band divided by the amplitude of the first peak minus the amplitude of the knee value.

9. The method for automatically adjusting the control parameters of a self-tuning controller used to regulate a process having a measured process variable signal, comprising the steps of:

generating an error signal representing a closed-loop response of the process to an upset condition;

measuring a noise component signal of said error signal for establishing a noise band;

measuring a first and second amplitude value, indicative of pattern features of said error signal, wherein said first amplitude value is a local extremum which exceeds said noise band, to produce a measured overshoot characteristic of said error signal; and automatically adjusting at least one of the control parameters of the controller to improve the difference between one of said overshoot characteristics and a target overshoot characteristic and updating said noise band during a quiet state of said error signal.

10. The method of claim 9, further including the steps of estimating a third amplitude value and selecting a decay characteristic value determined from the smaller of a target decay value or a calculated decay value using said amplitudes.

11. The method of claim 9, wherein the step of measuring amplitude values includes measuring at least four successive amplitude values of local extrema of said error signal.

12. The method of claim 11, wherein the step of measuring amplitudes includes estimating said fourth amplitude value if said fourth amplitude value cannot be measured.

13. The method of claim 9, further including the steps of measuring a third amplitude value and calculating a decay characteristic.

14. The method of claim 13, wherein the step of measuring amplitudes further includes the step of selecting three successive amplitude values to produce the overshoot characteristic and the decay characteristic, wherein said measured decay characteristic is greater that said overshoot characteristic.

15. The method of claim 14, wherein said amplitude values are local extrema of said error signal.

16. The method of claim 9, wherein the step of measuring the second amplitude value includes locating a knee of said error signal later in time to said first amplitude value.

17. The method of claim 16, further including the step of determining the period between the first amplitude and said knee to determine a time scale of the error signal response.

18. The method of claim 17, wherein said time scale is used to determine a length of time for searching for a second extremum.

19. The method of claim 17, wherein said time scale is used to determine a period for locating and confirming a third amplitude value.

20. The method of claim 16, wherein the step of measuring the amplitudes includes selecting said knee as said second amplitude.

21. The method of claim 16, wherein the step of locating said knee of said error signal including locating said knee later in time to said second amplitude value.

22. The method of claim 9, wherein the step of automatically adjusting includes determining the type of process being regulated and selecting control parameters appropriate to the determined process type.

23. The method of claim 22, wherein the step of automatically adjusting further includes comparing measured data with interpolated data from at least two predetermined processes to determine an interpolating factor indicative of the type of process being regulated for adjusting at least one of the control parameters.

24. The method of claim 22, wherein the step of automatically adjusting further includes comparing measured data with extrapolated data from at least two predetermined processes to determine an extrapolating factor indicative of the type of process being regulated.

25. The method of claim 9, further including the steps of sampling a user-selected process variable before the step of measuring amplitude values and selecting from a previously stored set of control parameters to provide an improved tuning for the present process condition.

26. The method of claim 25, wherein the time varying process variable is subdivided into subranges in which each subrange corresponds to a set of previously adapted control parameters.

27. The method of claim 9, further including the step of filtering said set-point signal with a lead-lag filter to prevent an excessive error overshoot in response to a set-point change when the controller is well tuned for a load upset.

28. The method of claim 27, further including the step of adaptively tuning a ratio of said lag-lead filter to achieve a target overshoot value.

29. A method for automatically adjusting the control parameters of a self-tuning controller used to regulate a process having a measured process variable signal, comprising the steps of:

(a) generating an error signal representing a closed-loop response of the process to an upset condition;

(b) locating and measuring amplitude values characterizing pattern features of said error signal;

(c) selecting three successive amplitude values to produce measured decay and overshoot characteristics of said error signal;

(d) discarding said first amplitude value if said measured decay characteristic is not greater than said overshoot characteristic;

(e) repeating steps b through d until said three successive amplitude values produce said measured decay characteristic greater than said overshoot characteristic; and (f) automatically adjusting at least one of the control parameters of the controller to improve the difference between one of said measured characteristics and a target characteristic.

30. The method as in claim 29, wherein said amplitude values are local extrema of the error signal.

31. The method as in claim 29, wherein said error signal is equal to the difference between a process variable signal and a set-point signal.

32. The method of claim 29, wherein the step of automatically adjusting the control parameters includes determining the type of process being regulated and determining changes in the control parameters as a function of the process type.

33. The method of claim 32, wherein the step of automatically adjusting further includes comparing measured data with interpolated data from at least two predetermined processes to determine an interpolating factor indicative of the type of process being regulated.

34. The method of claim 33, wherein the interpolated data includes control parameters.

35. The method of claim 34, wherein the controller parameters include proportional and integral time data.

36. The method of claim 32, wherein the step of automatically adjusting further includes comparing measured data with interpolated data from at least two predetermined processes to determine appropriate changes in the control parameters.

37. The method of claim 29, wherein the step of automatically adjusting further includes comparing measured data with extrapolated data from at least two predetermined processes to determine appropriate changes in the control parameters.

38. The method as in claim 29, wherein the step of locating and measuring amplitude values includes locating and measuring at least four successive amplitude values of local extrema of said error signal.

39. The method as in claim 38, wherein the step of locating and measuring amplitudes includes estimating said fourth amplitude value if said fourth amplitude value cannot be measured.

40. The method of claim 39, wherein the step of locating and measuring the amplitudes includes locating a knee of said error signal later in time to a first local extremum.

41. The method of claim 38, further including the step of determining the period between the first local extremum and said knee to determine a time scale of the error signal response.

42. The method of claim 41, wherein the first local extremum is selected as the first of three successive amplitude values and said time scale is used to determine a maximum wait period for locating a second amplitude.

43. The method of claim 42, wherein the step of selecting the amplitude values if said maximum wait period expires before locating a second local extremum.

44. The method of claim 41, wherein said time scale is used to calculate a maximum wait period for locating a third amplitude.

45. The method of claim 38, wherein the step of locating said knee later in time to a second local extremum.

46. The method of claim 38, further including the step of validating the knee of said error signal.

47. The method of claim 29, further including sampling a user-selected process variable before the step of locating and measuring amplitude values and selecting previously adapted control parameters, based on a sampled value of the user-selected process variable, from a previously stored set of control parameters to provide an improved tuning for the present process condition.

48. The method of claim 47, wherein the process variable range is subdivided into subranges in which each subrange corresponds to a set of previously adapted control parameters.

49. The method of claim 29, wherein the step of selecting three successive amplitude values includes indicating the sign of the first amplitude values to determine whether it is positive or negative, and inverting the values of said three amplitude values if the sign of the first amplitude is negative for simplifying the step of measuring said amplitude values.

50. The method of claim 31, further including the step of filtering said set-point signal with a lead-lag filter to prevent an excessive error overshoot in response to a set-point change when the controller is well tuned for a load upset.

51. The method of claim 50, further including the step of adaptively tuning a ratio of lead-to-lag of said lead-lag filter to achieve a target overshoot value.

52. The method of claim 29, further including the steps of measuring an error noise and updating a noise band during a quiet state of said error signal.

53. The method of claim 29, further including the step of validating the measured amplitude values of local extrema.

54. A self-tuning control system comprising:

a controller having control parameters for regulating a process having a measured process variable signal;

means for generating an error signal representing a closed-loop response of the process to an upset condition; and an adaptor for automatically adjusting control parameters of the controller, said adaptor comprising:

means for measuring amplitude values characterizing the pattern features of said error signal;

means for choosing three successive amplitude values to produce measured decay and overshoot characteristics of said error signal;

means for selecting three successive amplitude values wherein said measured decay characteristic is greater than said overshoot characteristic, said selection means comprising the steps of:

(i) determining the measured decay and overshoot characteristics of said three successive amplitude values; and (ii) discarding said first amplitude value and locating a new third amplitude value if said measured decay characteristic is not greater than said overshoot characteristic of said three successive amplitude values; and (iii) repeating steps (i) through (ii) until the three successive amplitude values are indicative of said measured decay characteristic greater than said overshoot characteristic; and means for automatically adjusting at least one of the control parameters of the controller to improve the difference between one of said measured characteristics and a target characteristic.

55. A method for automatically adjusting the control parameters of a self-tuning controller used to regulate a process having a measured process variable signal, comprising the steps of:

(a) generating at least one signal representing a closed-loop response of the process;

(b) detecting whether the process has experienced an upset condition as indicated by the signal exceeding a threshold;

(c) sampling a user-selected process variable signal;

(d) selecting control parameters from previously stored sets of control parameters based on a sampled value of the user-selected process variable and the signal;

(e) adjusting at least one of the control parameters of the controller based on the selected sets of control parameters obtained from said selection step;

(f) observing the transient behavior of the signal;

(g) altering at least one of the control parameters of the controller to improve the behavior of the process;

(h) replacing the previously stored set of control parameters with the control parameters of said altering step; and (i) repeating steps (f) through (h) until the signal is within the threshold for a specified amount of time thereby indicating that the upset condition has subsided.

* * * * *